G. POTSTADA.
SHEET CUTTER.
APPLICATION FILED NOV. 14, 1908.
982,743.
Patented Jan. 24, 1911.
2 SHEETS—SHEET 1.
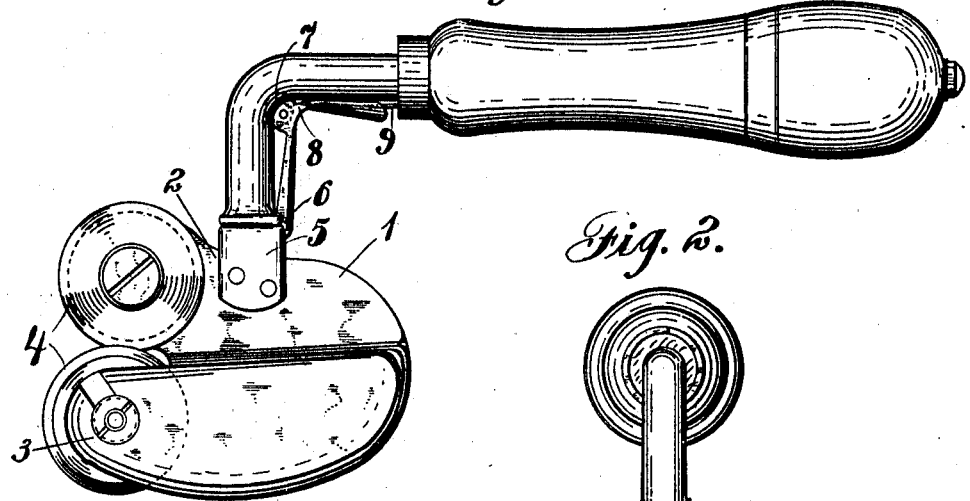
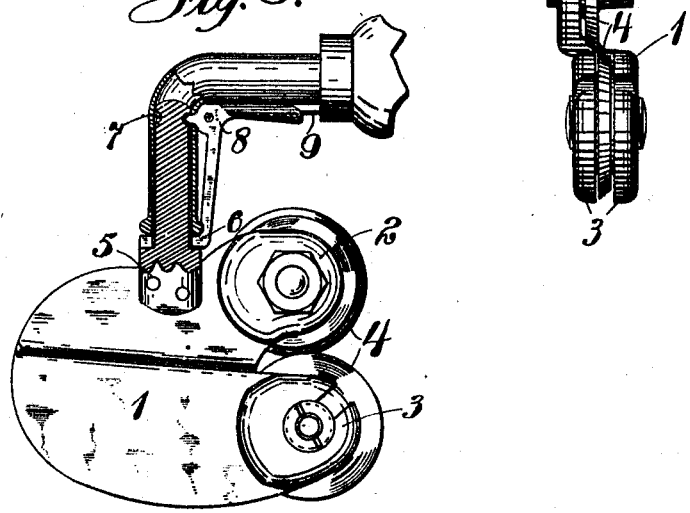
Witnesses
David Solari
Inventor
George Potstada
By Medina and Griffin
Attorneys G. POTSTADA.
SHEET CUTTER.
APPLICATION FILED NOV. 14, 1908.
982,743.
Patented Jan. 24, 1911.
2 SHEETS—SHEET 2.
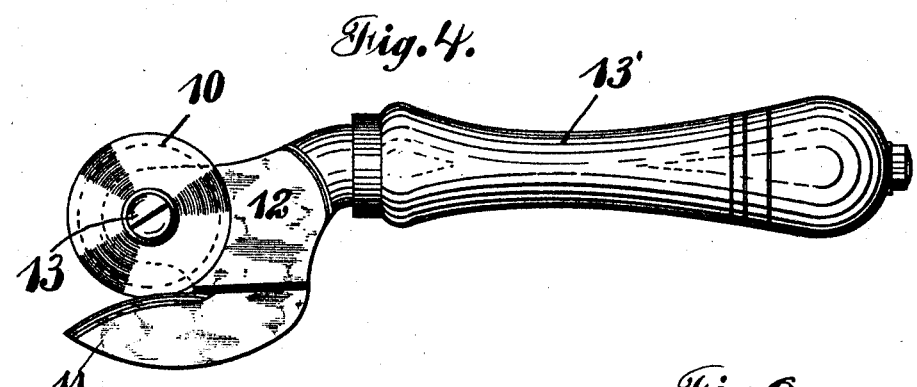
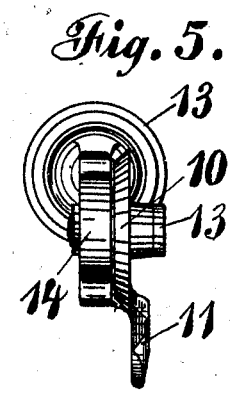
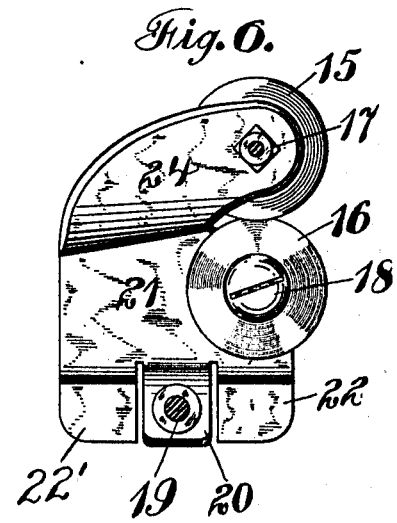
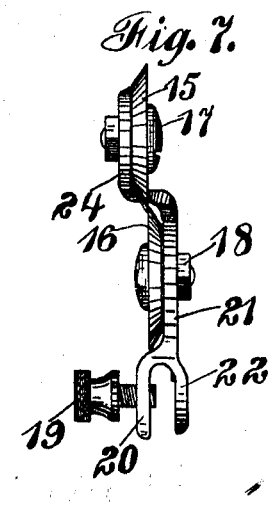
Witnesses
David Solari
Inventor
GEORGE POTSTADA
By Medina and Griffin
Attorneys

UNITED STATES PATENT OFFICE.

GEORGE POTSTADA, OF SAN FRANCISCO, CALIFORNIA.

SHEET-CUTTER.

982,743. Specification of Letters Patent. Patented Jan. 24, 1911.

Application filed November 14, 1908. Serial No. 462,724.

*To all whom it may concern:*

Be it known that I, GEORGE POTSTADA, a subject of the Emperor of Germany, residing at San Francisco, in the county of San Francisco and State of California, have invented a new and useful Sheet-Cutter, of which the following is a specification in such full and clear terms as will enable those skilled in the art to construct and use the same.

This invention relates to a device used for the purpose of cutting sheets of all kinds, as linoleum or heavy paper.

An object of the invention is to produce a cutter which will quickly and easily cut the sheet.

Another object of the invention is to make a cutter which can be operated either from or toward the person using it.

Another object of the invention is to produce a cutter which will have its cutting parts easily renewed when dull.

In the drawings, in which the same numerals are applied to the same parts throughout, Figure 1 is a side view of the cutter, Fig. 2 an end view of the same, Fig. 3 a side view with the cutter head reversed and showing only a portion of the handle, Fig. 4 is a modified form of the cutter in side elevation, Fig. 5 is an end view of the same, Fig. 6 is a side view of a cutter the same as Fig. 1 except that it is intended to be secured to any object as a knife or a pair of scissors, and Fig. 7 is an end view of the cutter shown in Fig. 6.

The body 1 is provided with the forwardly projecting noses 2 and 3 each of which carries a cutting wheel 4, said wheels being freely movable on their axes. On the upper part of the body 1 there is a shank 5 which has a groove around it near the top thereof in which a pin on the catch 8 takes, said groove being open at one place to allow the removal of the handle. Near the base of the shank there is a notch at the rear and at the front of the body into which the catch 6 of the handle takes. The handle is formed with a hollow shank 7 on which is pivoted the catch 8, the lower end of which projects into the groove on the shank, a spring 9 holding the catch in the groove. The groove on the shank of the cutter is open upwardly at a point about one half the distance from the two points at which the catch holds the handle from turning, the object being to permit the catch to pass off the shank at said position when it is desired to place the cutter in the pocket or in a tool box.

It will be noted that immediately in the rear of the cutters 4 the frame supporting them has a flat chisel face at right angle to the plane of contact of the cutters. The object of this construction is to provide the means whereby a sheet of stiff material may be cut readily without distorting it in its own plane, the chisel acting to cause the sheet to bend slightly in a direction at right angles to its own plane.

The two cutters are journaled in contact and have the edges sharpened as may be found desirable on opposite sides, the contact of the two cutters being as small as possible in order to give a small angle between the cutting edges. When thick and heavy material is to be cut large cutters may be employed, in which instance it is desirable to make the angle of slope of the knife edges of the cutters somewhat less than that shown in the drawings.

In operation all that is required is to take the cutter in one hand and the sheet to be cut in the other and draw the sheet through the cutter, or if it happens to be more convenient the sheet may be left stationary, as where a large sheet of linoleum is to be cut and the knife may be pushed through the sheet. In fact the knife may be used in a number of different ways as may be convenient, but in any event the cut may be made as fast as the knife can be pushed.

In Fig. 4 is shown another form of the cutter, there being only one rotary cutter 10 having the axle 13 secured to the head 12 to which is secured the handle 13', the cutting being accomplished with the wheel 10 and the knife 11, said knife being fixed and having the sharpened edge thereof in contact with the edge of the rotary cutter. This cutter is operated in the same way as the one first described, save that it cannot be turned around, the handle being fixed.

In Figs. 6 and 7 there is shown a form substantially the same as that of the first figures save that the head is made in a cheaper form and the cutter is adapted to be secured to any desired object as a knife, or a shear blade. The cutters 15 and 16 are circular knives carried on pins 17 and 18 which are secured to the pressed steel head 21, said head being provided with a forwardly projecting nose 24 similar to the projecting nose of Fig. 1. The base of the head is cut into the three depending members 20, 22 and 22', the two latter of which may be placed on one side of a knife and the member 20 on the other side thereof, a set screw 19 being used to secure the head thereto, when a convenient handle is formed for the cutter.

What I claim as new and desire to secure by Letters Patent of the United States is as follows:

1. In a sheet cutter, a head having a pair of projecting noses, a circular cutter carried by each nose and in contact with each other, a pivoted handle secured to the head, means to secure the handle to the head either in the front or the rear of the circular cutters said means consisting of a pivoted catch having a finger hold, and a spring adapted to press said catch into engagement with the head.

2. In a sheet cutter, a frame having a pair of projecting noses each in different adjacent planes said noses connected by means of a wedge having a knife edge extending transversely of the planes of the noses, and a sharpened roller carried by each of said noses said rollers being in contact with each other and being in front of said knife edge, as set forth.

In testimony whereof I have set my hand this 7th day of October A. D. 1908, in the presence of the two subscribed witnesses.

GEORGE POTSTADA.

Witnesses:
W. T. HESS,
C. P. GRIFFIN.